United States Patent [19]

Krug et al.

[11] 3,984,911
[45] Oct. 12, 1976

[54] PROCESS FOR MANUFACTURING AN ELECTRODE FOR ELECTROLYTICALLY FORMING A GROOVE PATTERN IN AN ARCUATE SURFACE OF AN ARTICLE

[75] Inventors: Manfred Krug, Schweinfurt; Siegbert Kessler, Rottershausen, both of Germany

[73] Assignee: SKF Industrial Trading and Development Company, B.V., Nieuwegein, Netherlands

[22] Filed: July 3, 1975

[21] Appl. No.: 593,169

[30] Foreign Application Priority Data

Aug. 1, 1974  Germany............................ 2437047

[52] U.S. Cl.................................. 29/424; 29/423; 29/527.4
[51] Int. Cl.² .................. B23P 17/00; B22D 11/126
[58] Field of Search..................... 29/527.4, 424, 423

[56] References Cited
UNITED STATES PATENTS

| | | | |
|---|---|---|---|
| 1,624,597 | 4/1927 | Heathcote | 29/424 UX |
| 2,636,849 | 4/1953 | Brenner | 29/527.4 X |
| 3,130,487 | 4/1964 | Mears | 29/424 |
| 3,866,308 | 2/1975 | Halasz | 29/527.4 |

*Primary Examiner*—C.W. Lanham
*Assistant Examiner*—V. K. Rising
*Attorney, Agent, or Firm*—Daniel M. Rosen

[57] ABSTRACT

A method for forming an arcuate electrode adapted for the electrolytic production of grooves in the arcuate surface of an article, in which grooves are first formed in a plane metal blank. The grooved blank is then reshaped to have a curvature corresponding to that of the article, and the grooved curved surface of the blank is coated with an insulating material. The insulating material is then removed from the surface of the blank, except in those areas overlying the grooves, and the thus bared portion of the blank is then eroded, for example, by etching, so that the residual insulating layer projects from the surface of the blank. In use, the thus formed electrode is employed as a cathode, with the projecting insulation being held in close contact with a corresponding curved surface of the article to be grooved. The article is connected as an anode, and an electrolytic liquid is directed to flow in the channels formed between the electrode and the article.

13 Claims, 12 Drawing Figures

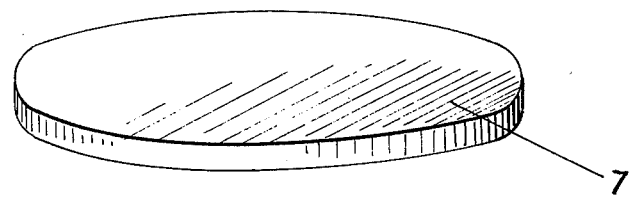
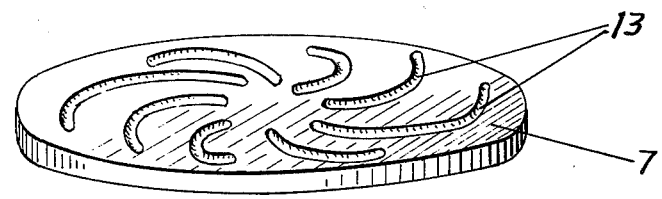
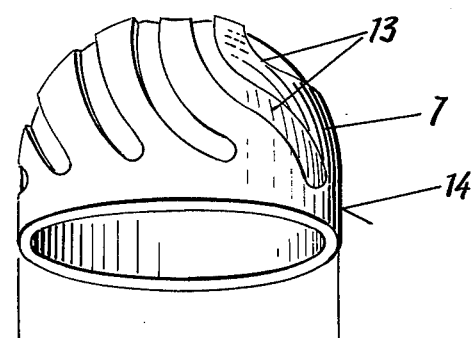
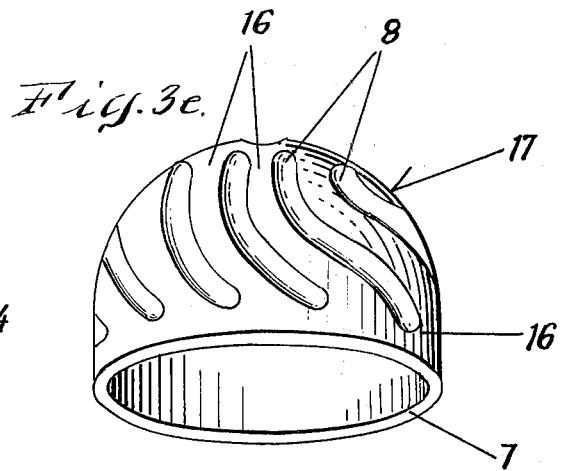
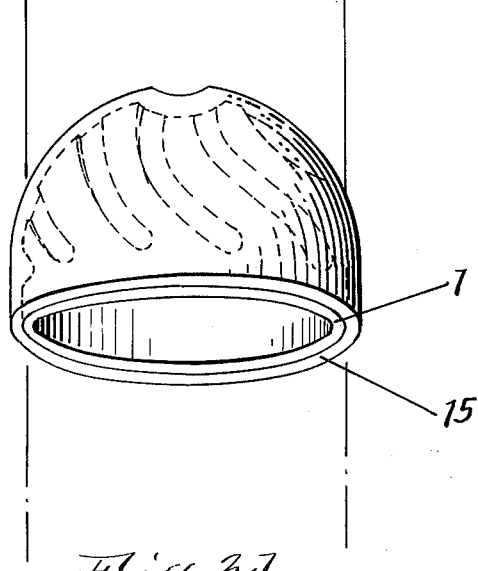
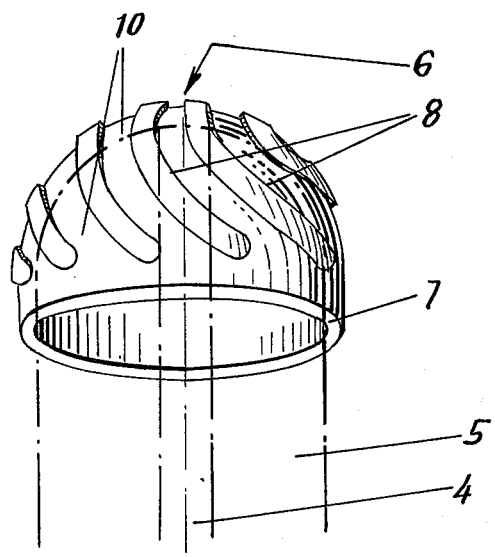

PROCESS FOR MANUFACTURING AN ELECTRODE FOR ELECTROLYTICALLY FORMING A GROOVE PATTERN IN AN ARCUATE SURFACE OF AN ARTICLE

THE INVENTION

The present invention relates to a process for manufacturing an electrode for electrolytically forming a groove pattern in an arcuate surface of an article, especially for forming a spiral groove pattern in the spherical surface of a hydrodynamic plane bearing race.

In a known process, metallic electrodes are formed by milling or embossing in order to adapt them to the desired design of a pattern to be electrolytically formed in an article. Such electrodes are expensive to manufacture if arcuate articles are to be electrolytically processed, since complicated shaping tools are required in order to form the electrode, in addition to a relief design therein, with a degree of curvature or convexity adapted to that of an article to be produced. In addition, inactive parts of the electrode surface must usually be protected from the corroding action of the electrolytic liquid, for example, by application of a plastic laminate, etc., to the electrode surface.

It is the object of the present invention to provide an improved process for the production of an electrode for the electrolytic processing of arcuate surfaces of articles, which overcomes the above disadvantages of known methods.

Briefly stated, according to the invention, the above object is achieved by providing a process in which a pattern of complementary grooves is formed, for example, by milling in the planar surface of a blank which is to later be directed toward the article in an electrolytic forming process. The blank is made of electrically conductive material. Subsequently, the plane blank is reshaped so that the side thereof to be directed toward the article has a determined degree of curvature adapted to the curvature of the article surface. Such reshaping may be effected in stages, for example, by several pressure pistons having arcuate surfaces which engage the surfaces of the blank on the electrode side. The other side of the blank surface is supported by an elastically resilient cushion of, for example, polyurethane or lead. An electrically insulating layer, for example, of plastic, is then applied to the surface of the blank. After such application, the layer is partly removed, for example, by abrasion by means of shaped grinding wheels, until the arcuate surface of the blank has been bared at such portions thereof which do not have complementary grooves. Finally, the exposed portions of the surface are reduced by means of a suitable erosion process, for example, deep etching or electromagnetic erosion, so that the residual portion of the electrically insulating layer over the complementary grooves remain elevated with respect to the article-oriented surface. A complete electrode head or upper end is thus formed, and can in turn be employed to electrolytically form a groove pattern in the correspondingly curved surface of an article. In use, the electrode head is mounted on the electrode shaft and is pressed against the correspondingly curved surface of the article during formation of the groove pattern, so that the residual portion of the electrically insulating layer over the complementary grooves of the ground surface of the electrode firmly engages the correspondingly curved surface of the article. An electrolytic liquid flows under pressure through the ducts formed between the exposed, recessed portions of the grooved surface of the electrode and the curved surface of the article. The electrolytic liquid contacts the curved surface of the article along these channels, thereby wetting the same so that, at these locations, electrolytic erosion occurs on the surface in the generally known manner, and the desired corresponding grooves are formed in the article.

The process according to the invention provides the advantage of enabling the formation of the complementary groove pattern on a plane surface of the electrode head and fixed therein by simple means, for example, by means of an end cutter. Furthermore, the curvature of the grooved surface of the electrode is accurately adapted to that of the article independently of the formation of the complementary groove pattern. Thus, various degrees of curvature of the article surface can be easily and readily attained in an advantageous manner.

In order that the invention may be more clearly understood, it will now be described in greater detail with reference to the accompanying drawings, wherein:

FIGS. 3a–3f are schematic illustrations showing sequential stages of a manufacturing process for producing the electrode of FIG. 1, in accordance with the invention;

Figure 1:
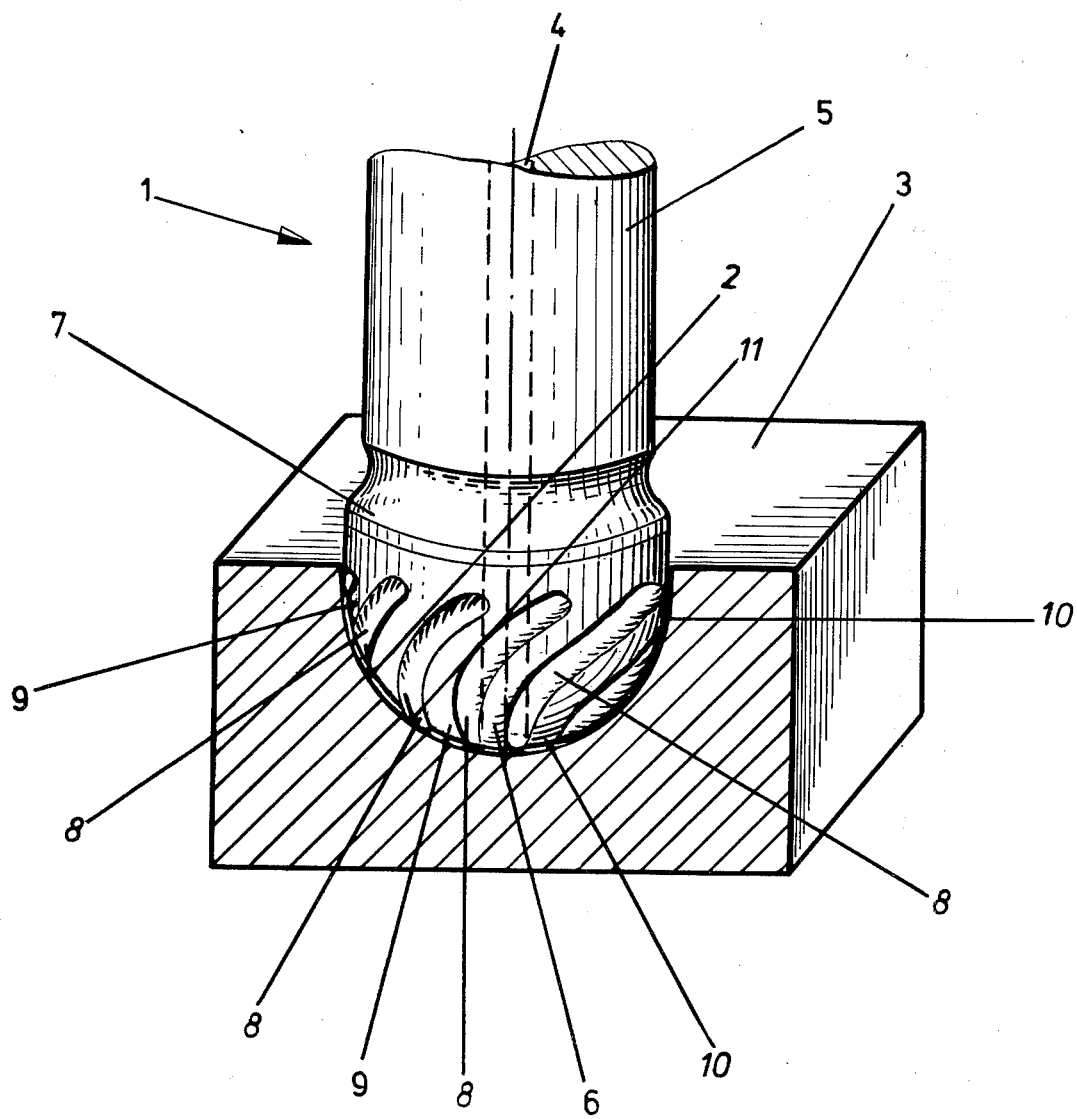
FIG. 1 is a perspective schematic view of a completed electrode positioned to electrolytically form an article.
Figure 2:
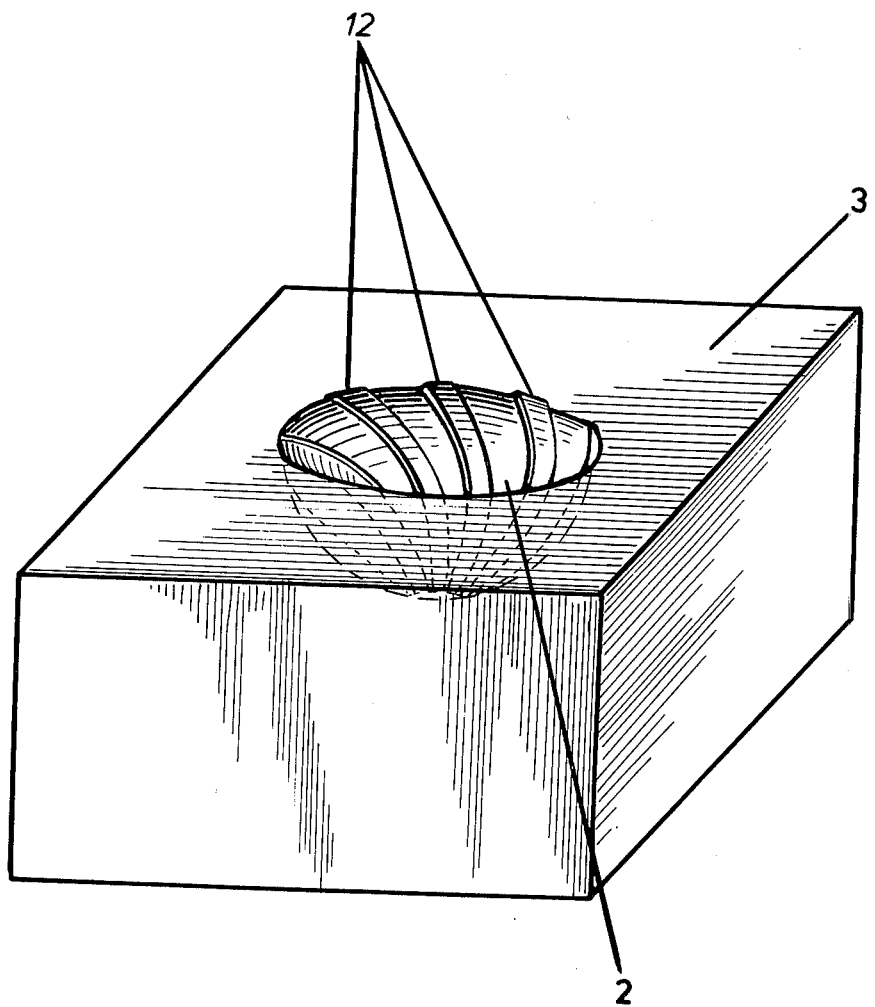
FIG. 2 is a perspective view of an article having a spiral groove pattern electrolytically formed by means of the electrode of FIG. 1.

Referring now to the drawings, FIG. 1 illustrates one manner of employing an electrode 1 manufactured in accordance with the invention. The electrode 1 is wired as a cathode and is pressed against the spherical surface 2 of the workpiece 3 connected as an anode. In the present example, the workpiece is a bearing calotte for spiral groove bearings. An electrolytic liquid is directed to flow through the central bore 4 of the shaft 5 of electrode 1, towards the center of the spherical surface of the article 3, passing through orifice 6 of the electrically conductive blank 7. The blank 7 has an arcuate surface oriented toward the article 3, and a residue 8 of an electrically insulating layer is provided on this surface. The liquid thence flows through the connecting ducts 9 between the exposed or stripped portions, and recessed portions 10 of blank 7 and the opposite portions of the spherical surface 2 of the workpiece 3, and then flows outwardly of the assembly. The electrolytic processing is effected in a known manner whereby a spiral groove pattern shown in FIG. 2 is formed on the article 3 by electrolytic action along ducts 9, and whereby the portions of the spherical surface 2 of the article 3 opposite the exposed and recessed parts 10 of the blank 7 are eroded electrochemically. The residue 8 of the electrically insulating layer of the electrode 1 directed towards the article firmly engages the correspondingly curved surface of the article 3, inhibiting the ingress of the reactive electrolytic liquid at their contact surfaces 11 and also preventing a detrimental flow of electric current between the electrode 1 and the workpiece 3 at that location. The desired depth of the groove pattern 12 can be controlled by changing the applied electrical voltage and/or by changing the condition of flow (for example, period of contact and pump pressure) of the electrolytic liquid.

The manufacturing process for producing the electrode 1, in accordance with the invention, is schematically illustrated in FIGS. 3a–3f. As shown in FIG. 3a a plane, preferably round blank 7 of an electrically conductive, ductile strip material, namely sheet copper is produced, for example, by stamping. A complementary groove pattern 13 is formed in the surface of the plane blank 7, for example, with an end mill cutter, as shown in FIG. 3b. The blank 7 is then reshaped so that the surface 14 of the blank 7 directed towards the workpiece has a curvature corresponding with the curvature of the spherical surface 2 of the workpiece, as shown in FIG. 3c. An electrically insulating layer 15 is applied to the surface 14 of the blank 7 directed towards the workpiece shown in FIG. 3d. The layer 15 is then eroded, for example, by grinding with a shaped wheel, etc. until the areas 16 of the blank 7 not having complementary grooves 13 directed towards the article have been stripped and a residue 8 of the electrically insulating layer 15 remains in the complementary grooves 3 of the blank 7, as shown in FIG. 3e, whereby the surface 17 to be directed toward the workpiece in use has a spherically curved shape with a curvature of the same dimension as that of the spherical surface 2 of the article 3. The areas 16 not having complementary grooves 13 of the surface 17 of the blank 7 are then recessed by a suitable erosion process, so that the residue 8 of the electrically insulating layer 15 remains as projecting elevations on said surface, as shown in FIG. 3f. Then the ungrooved side of the completely finished blank 7 is fastened to the end of the electrode shaft 5 that is to be directed towards the article, for example, by glueing or soldering. The electrode shaft 5 (represented by hatching in FIG. 3f) is provided with a central bore 4, and the blank 7 is provided with a coaxial orifice 6 which communicates with the bore 5 and leads into the ducts 9 formed between the stripped or exposed and recessed areas 10 of the blank 7 and the opposite areas of the spherical surface 2 of the article 3.

Figure 4A:
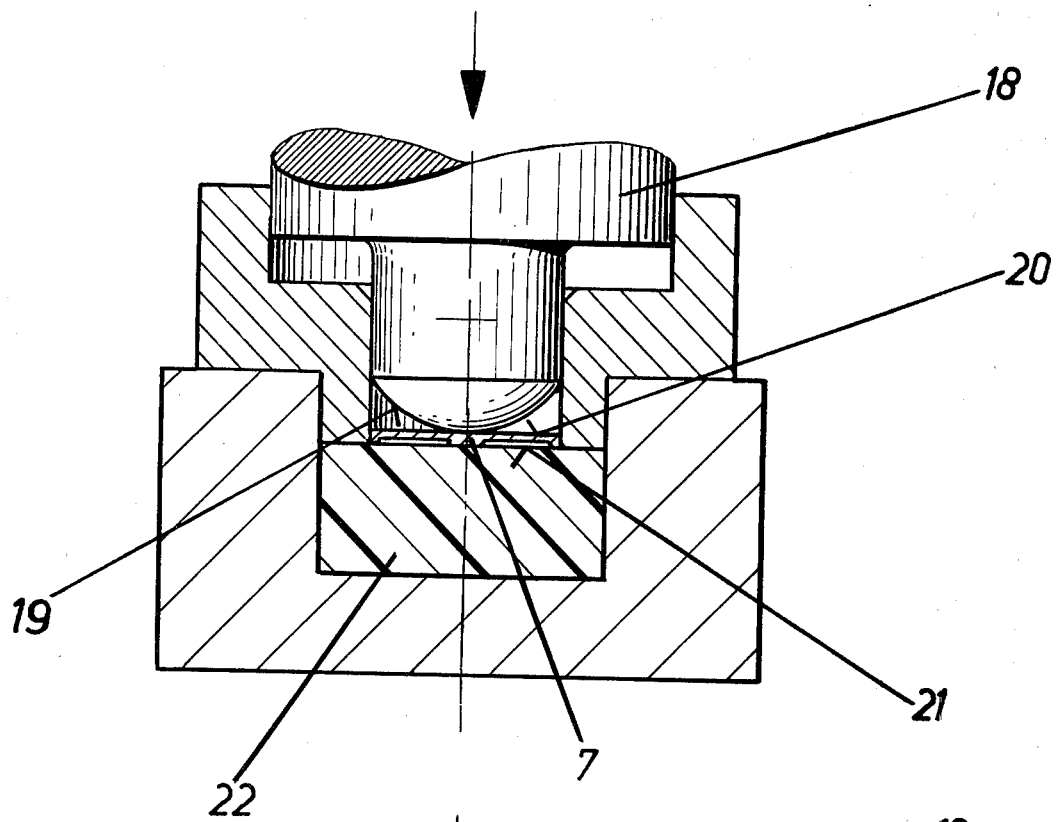
FIGS. 4a and 4b are schematic illustrations of successive steps of a first work stage for reshaping the blank.
Figure 4B:
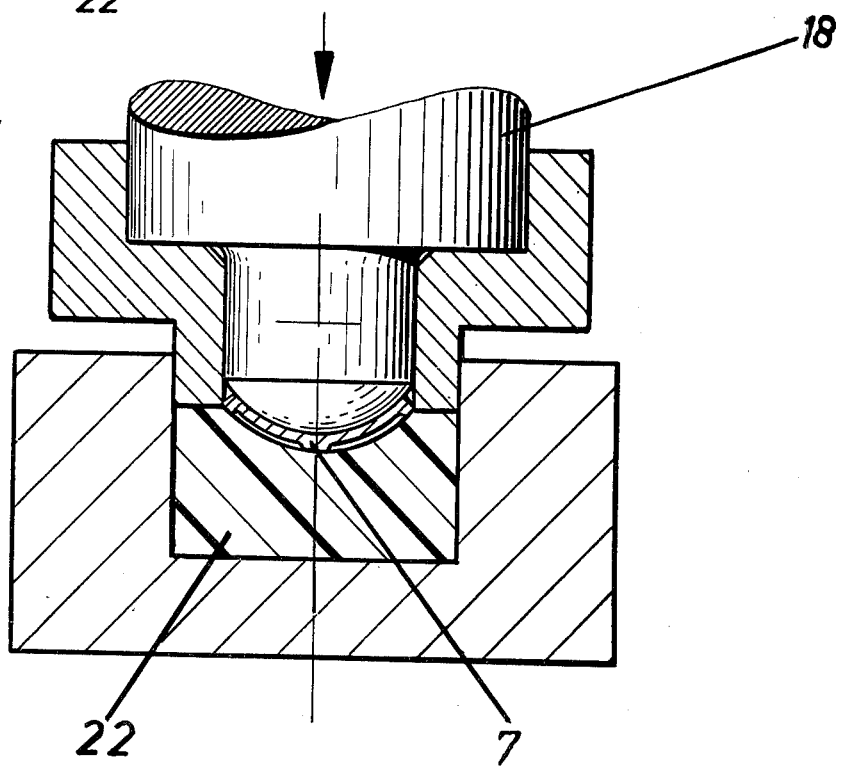
Figure 5A:
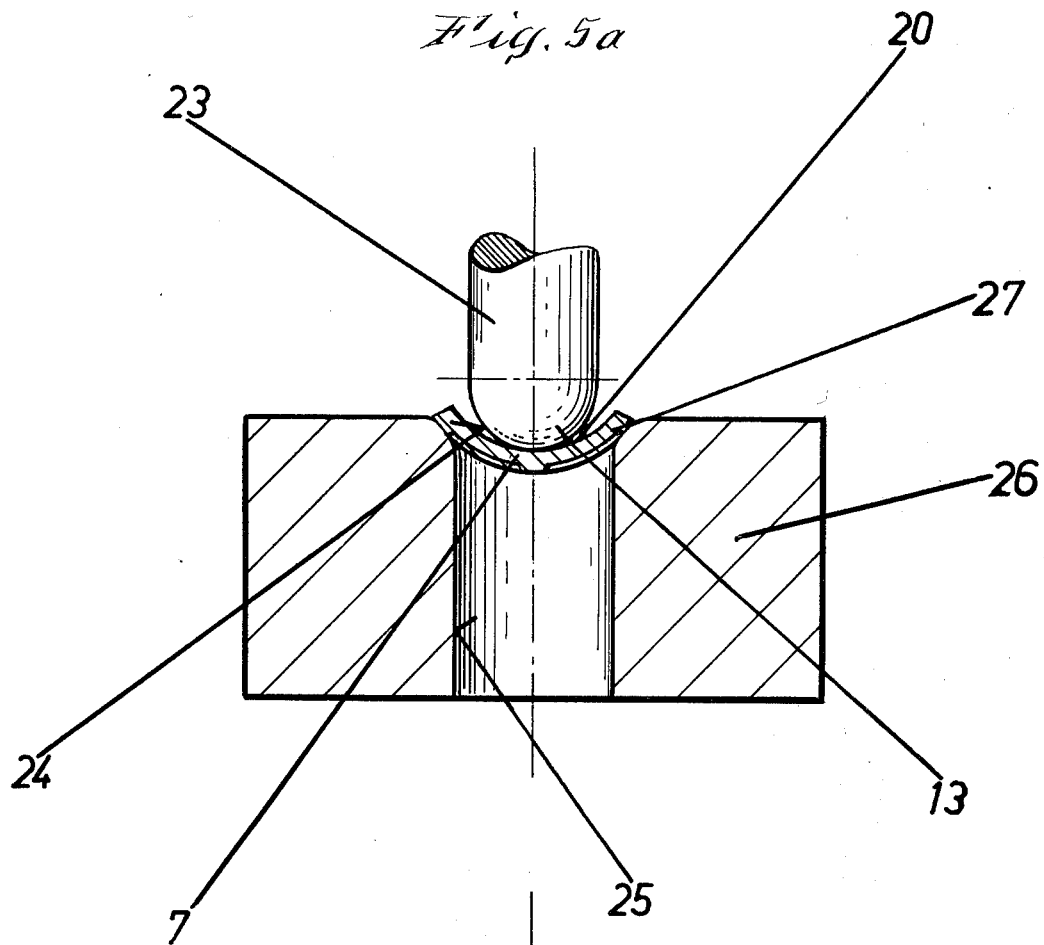
FIGS. 5a and 5b are schematic illustrations showing sequential steps of the second work stage for reshaping the blank.
Figure 5B:
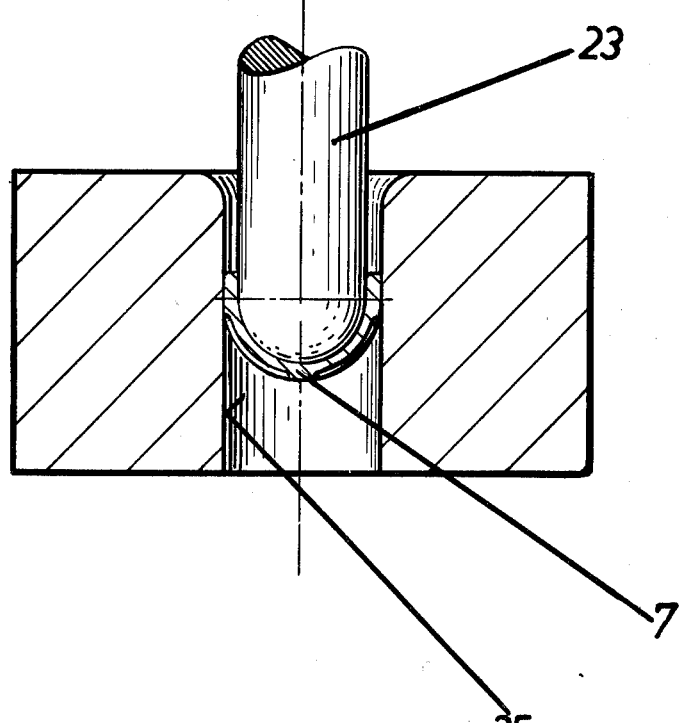

The stripping of blank 7 is preferably effected in two stages. In the first stage, as shown in FIG. 4a, the ground surface 21 of the blank 7, which will be directed towards the article, in use, is assembled against a plastic cushion 22, for example, of polyurethane or lead. The plate is then preformed, as shown in FIG. 4b, by pressing the spherically curved pressure surface of a first pressure piston against the other surface 20 of the blank 7. Due to the elastic and resilient support of surface 21, the complementary grooves 13 in the surface 21 of blank 7 are thereby not deformed or shaped or depressed in any way. During the subsequent second work stage illustrated in FIG. 5a, the spherical pressure surface 24 of a second pressure piston 23, is placed against the electrode-side surface 20 of the blank 7 which has been shaped during the first work stage. The blank 7 is thereby forced into the bore 25 of the mold 26, deep-drawn therein, and formed with a complete hemispherical end, as shown in FIG. 5b. In the foregoing embodiment, the complementary grooves preferably do not extend to the outer edge 27 of the blank 7 which, during the deep-drawing operation, contacts the wall section of the bore 25 of mold 26. This permits pressing the edge 27 into shape during the second work cycle, without depressing the centrally located complementary grooves. Any possible thickening or protrusions formed during the first pressing stage are equalized during the second pressing stage. Recessing the areas 16 of the grooved article-side surface 17 of the blank 7 may be achieved by the known deep-etching processes. The electrically insulating layer 15 of the blank 7 must, in such cases, consist of a caustic-resistant material, for example, plastic, so that after removal of said layer the remaining residue 8 covers and protects the areas which are not to be etched, namely the complementary grooves of the article-side surface 17. Recessing of the areas 16, however, can also be achieved by an electrolytic erosion process. Thus, the blank 7, mounted on an electrode shaft 5, may be connected as an anode by simply changing poles at the electrode and bringing the surface 17 into contact with an electrolytic liquid. The residual portions 8 of the electrically insulating layer 15 cover and protect the areas of the complementary grooves 13 of the grooved surface 17, which are not to be eroded, and are not attacked by the electrolytic fluid.

The embodiment of the present invention herein described can, of course, be modified without departing from the basic concept of the invention. The surface of the article, for instance, into which the groove pattern is to be etched, may have a convex curvature in which case the associated grooved surface of the electrode then is formed with a corresponding concave shape.

What is claimed is:

1. A method for producing an electrode for the electrolytic formation of a pattern of grooves in an arcuate surface of an article, comprising forming grooves in one side of a planar conductive blank, then reshaping said blank to have a curvature corresponding to said arcuate surface of said article, with said one side of said blank having a curvature opposed to that of said arcuate surface, then applying an insulating layer to said one side of said reshaped blank, then stripping said layer from said reshaped blank except in the regions thereof overlying said grooves, whereby a residual insulating layer remains on those areas of said reshaped blank overlying said grooves, and then recessing the stripped areas of said one side of said reshaped blank by eroding the material of said reshaped blank in those areas which are not covered by said residual insulating layer.

2. The method of claim 1, comprising forming said planar conductive blank by stamping, prior to forming said grooves therein.

3. The method of claim 2, wherein said step of stamping comprises stamping said conductive blank from sheet copper.

4. The method of claim 1, wherein said step of reshaping comprises supporting said one side of said blank on an elastically resilient cushion while pressing a curved piston against the other side of said blank.

5. The method of claim 4, wherein said step of supporting comprises supporting said blank on a polyurethane cushion.

6. The method of claim 4, wherein said step of supporting comprises supporting said blank on a lead cushion.

7. The method of claim 1, wherein said step of reshaping said blank comprises placing said one side of said blank on an elastically resilient cushion, then pressing a first curved piston against the other side of said blank to impart the curved shape thereto, and the pressing a second arcuate piston against said other side to deep-draw said blank and thereby complete its arcuate shape.

8. The method of claim 1, wherein said step of stripping comprises grinding said electrically insulating layer with a shaped grinder.

9. The method of claim 1, in which step of applying comprises applying an acid resistant material to said one side of said reshaped blank, and wherein said step of recessing comprises deep etching said one side of said reshaped blank.

10. The process of claim 1, wherein said step of recessing comprises electrolytically eroding said one side of said reshaped blank.

11. The method of claim 1, further comprising affixing said reshaped blank to an end of a shaft having an axial bore, whereby said one side of said reshaped blank is directed away from said end of said shaft, and providing an orifice in said reshaped blank.

12. The method of claim 11, wherein said step of affixing follows said step of recessing.

13. The method of claim 11, wherein said step of affixing precedes said step of recessing.

* * * * *

UNITED STATES PATENT AND TRADEMARK OFFICE
CERTIFICATE OF CORRECTION

PATENT NO. : 3,984,911
DATED : October 12, 1976
INVENTOR(S) : Manfred Krug, et al.

It is certified that error appears in the above-identified patent and that said Letters Patent are hereby corrected as shown below:

Column 1, line 60, delete "groove" and insert --grooved--

Column 5, line 1, delete "the" (second occurence) and insert --then--.

Signed and Sealed this

Thirty-first Day of May 1977

[SEAL]

Attest:

RUTH C. MASON
Attesting Officer

C. MARSHALL DANN
Commissioner of Patents and Trademarks